Sept. 16, 1952  R. A. BECKWITH  2,610,717
CLUTCH

Filed July 27, 1948  2 SHEETS—SHEET 1

INVENTOR.
R. A. Beckwith
BY Robbs Robb
Attorneys

Sept. 16, 1952 — R. A. BECKWITH — 2,610,717

CLUTCH

Filed July 27, 1948 — 2 SHEETS—SHEET 2

INVENTOR.
R. A. Beckwith
BY Robb & Robb
Attorneys

Patented Sept. 16, 1952

2,610,717

UNITED STATES PATENT OFFICE 2,610,717

CLUTCH

Raymond A. Beckwith, Milwaukee, Wis., assignor to Koehring Company, Milwaukee, Wis., a corporation Application July 27, 1948, Serial No. 40,801

6 Claims. (Cl. 192—35)

This invention relates to the art of clutches for connecting driving shafts or elements to driven elements such as a cable drum, or the like, and the clutch of the invention is designed especially for use in connection with cranes of shovel, clamshell, dragline types, though the utility of the invention is not at all confined to such application.

A primary objective of the invention has been to produce a clutch in which are employed a main clutch band for engaging the drum or element to be driven, together with an auxiliary or booster clutch band also cooperative with the driven element, and manual control means whereby to substantially simultaneously effect clutch loading of said clutch parts for smooth and efficient clutch application. The invention involves novel instrumentalities for connecting up the said clutch bands for operation in unison, which instrumentalities function to enable the operator to maintain the feel of the clutch loading until the full driving engagement of the clutch elements for connecting the driving means and driven means at the same speed, is established; at the same time the said instrumentalities interact in such a way that the clutch loading of the booster band causes power loading of the main band to increase the effectiveness of the latter proportionate with the manual effort impressed on the manual control means, which latter is usually a hand lever at an operator's station.

In carrying out my invention the booster clutch band or member is disposed externally to the clutch flange of drum or driven element, and the main clutch band or member internally thereof, the two clutch members thus being arranged to act on the opposite sides of such flange.

A specific construction and adaptation of my invention is disclosed in the accompanying drawings, in which.

Figure 1:
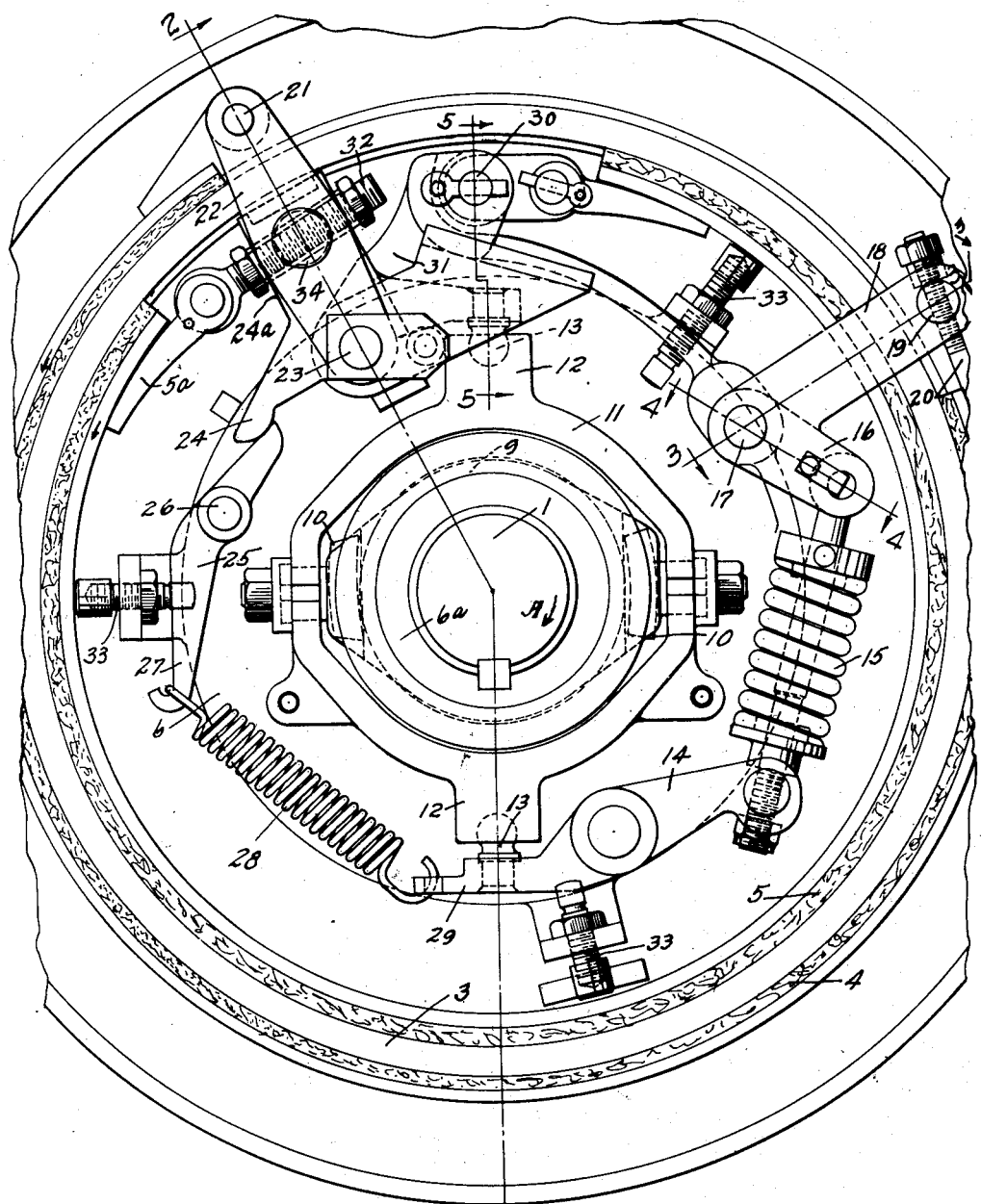
Figure 1 is a side view of a clutch unit embodying the principles of the invention, opposite portions of the clutch drum and booster clutch band being broken away for lack of space on the drawing.
Figure 2:
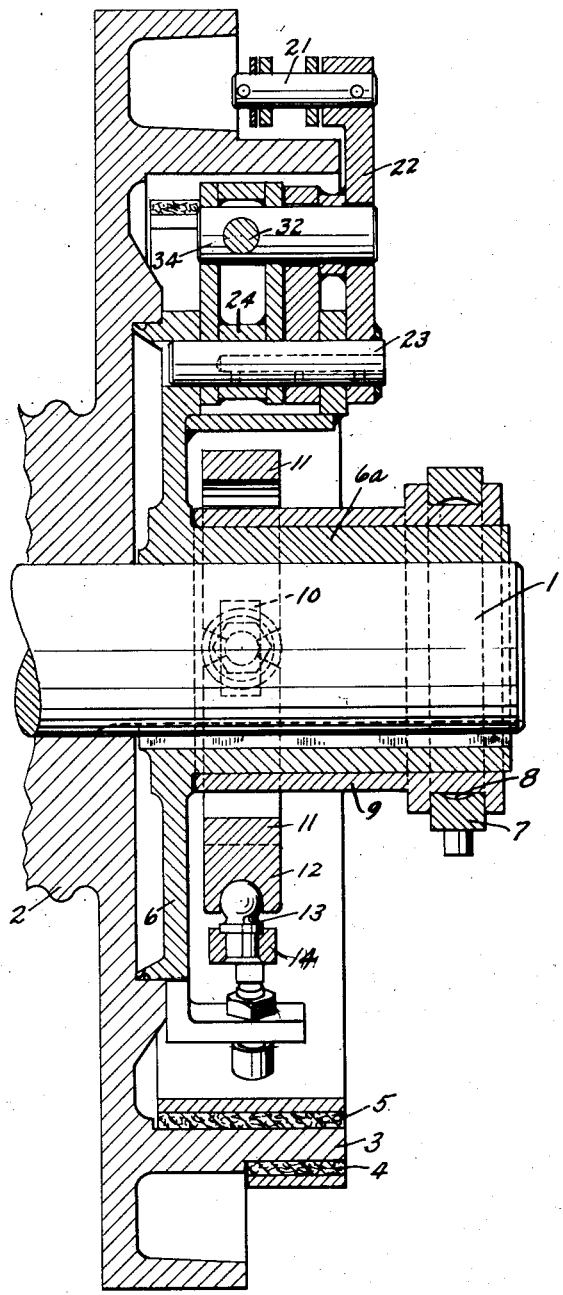
Figure 2 is a sectional view taken vertically and angularly through the clutch unit of the driving element or shaft about on the line 2—2 of Figure 1.
Figure 3:
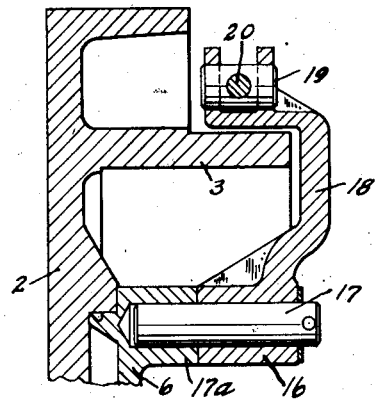
Figure 3 is a fragmentary sectional view taken about on the line 3—3 of Figure 1.
Figure 4:
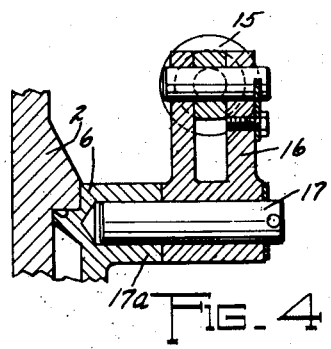
Figure 4 is a fragmentary sectional view taken on the line 4—4 of Figure 1.
Figure 5:
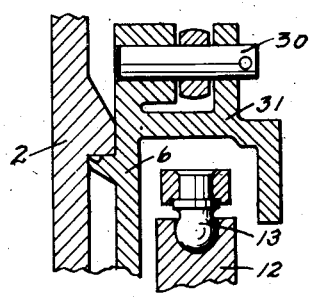
Figure 5 is a fragmentary sectional view taken on the line 5—5 of Figure 1.

Referring particularly to Figures 1 and 2 of the drawings, the general clutch unit disclosed embodies certain well known features in the art and by reason of the special application of the unit for driving of a cable winding drum or the like there is illustrated the driving shaft 1 which is normally driven with clockwise rotation, as indicated by the arrow A in Figure 1. On this driving shaft 1 is loosely mounted the drum 2 which is the driven element of the unit, said drum being provided with the lateral circular clutch flange 3 with which the main and booster clutch members of the clutch unit are adapted to engage, the booster or smaller clutch member or band being designated at 4 and the main clutch band at 5. On the shaft 1 is keyed the spider or carrier 6 of the clutch unit, the spider normally rotating with the shaft 1 as customary and carrying clutch shifting instrumentalities, as later set forth. Manual operating means for the clutch mechanism comprises a shifting collar 7 engaging the groove 8 of a shifting sleeve 9, said sleeve having opposite portions interengaged by the shifting shoes 10 of the toggle lever 11 centrally disposed relatively to the spider and encircling the hub 6a of the spider as well as the sleeve 9 and the shaft 1. Opposite arms 12 of the toggle 11 are provided with ball seats engaging the ball portions of joint members 13 which connect the toggle to certain parts of the clutch shifting instrumentalities. As seen in Figure 1, the lower ball or joint member 13 is carried by a lever 14, one end of which is connected by a heat compensator spring 15 with an arm 16 carried on a shaft 17 with which arm is also connected rigidly an arm 18 extending radially of the unit and attached at its outer end at 19 to the live end 20 of the booster clutch band 4. The booster clutch band 4 extends around the clutch flange 3 of the drum 2 externally of the latter and is dead-ended at 21 on the lever 22 pivoted at 23 to the spider 6. The lever 22 has at its inner side a lever 24 mounted on pivot shaft 23 on spider 6 and one end of which lever 24 engages one arm of a secondary lever 25, lever 25 being pivoted also on the spider at 26 and having its other arm 27 in hook connection with the release spring 28. The release spring 28 is connected at one end to the lever 27 and the other end of the spring 28 is interconnected to the arm 29 of the lever 14 opposite that which is attached to the compensator spring 15.

The main clutch member or band 5 is disposed internally of the clutch flange 3 of the drum 2 and is considerably larger, in reference to its clutch surface, than is the band 4. The main clutch band 5 is dead-ended at 30 on an arm 31 carried by the spider 6. At its opposite end, its live end 5a, the clutch band 5 is attached by a suitable pivot bolt connector 32 which passes through the lever 22 intermediate the ends of the latter and also passes through a vertical double arm 24a extending outwardly from the middle of the lever 24. The said lever 22 therefore has the dead end of the booster clutch band 4 attached thereto, as well as the live end of the main clutch band 5.

Suitable conventional adjusting members for the main clutch band 5 are carried by the spider 6 and are designated 33.

The clutch shifting toggle 11 has a live reaction at both of the arms 12 against the ball members 13, one of the ball members 13 being carried by the lever 14 and the other of said members being carried by the end of lever 24 opposite that which engages the lever 25.

Operation of the toggle 11 will effect outward movement of the ball member 13 to actuate the lever 14, and through the compensator spring 15 effect application of the booster band 4 at the live end 20 of the latter. The loading application of the booster band 4 to the drum flange 3 assists to apply the power of the driven shaft 1 and spider 6 connected therewith to the live end of the main clutch through the leverage action of the lever 22. Simultaneous with the operation of the loading application of the booster band, the rocking of the lever 24 by the upper ball member 13 seen in Figure 1 effects application of the manual force impressed on the operating means 7 to the lever 22 through the upper ball member 13 as seen in Figure 1, and the swivel pin connection 34 of the bolt means 32 with said lever 22 for direct application of the live end of the main clutch band to the clutch flange 3.

The spring 28 connected with the levers 14 and 27 normally tends to release both of the clutch bands when the manual means 7—8 is not being operated for the loading or application of the clutch engagement.

Summarizing the foregoing, it is notable that with the main clutch band 5 dead-ended on the driving spider mounting means at 30, the action of the manual force impressed at the upper ball member 13 seen in Figure 1 to apply the live end 5a through the lever 22, is simultaneously supplemented or boosted by the clutch loading or application of the booster band 4 incident to the impressing of the same force translated to the band 5 through the lower ball member 13 actuated by the toggle 11. Thus a smooth simultaneous application of the main and auxiliary clutch means is obtained, as hereinbefore referred to.

The spring 15 compensates for the change in the diameter of the clutch drum or flange 3 of the drum 2 incident to heat caused by clutch friction during the clutch application. The mounting means or spider 6 for the clutch shifting devices rotates constantly with said devices according to known operation of such means.

Further describing the clutch action, as the manual force is applied through toggle 11, part of this force acts to apply the main clutch band 5 through levers 22 and 24 to the clutch drum or flange 3, and part of the manual force acts to apply the booster clutch band 4 through lever 14, spring 15 and lever 18 to the drum or flange 3. Both bands 4 and 5 are applied to drum flange 3 simultaneously. There is no sudden application of the main clutch band when the booster clutch band is applied. This eliminates shock in application of the main clutch band 5. Also, this action enables a positive hand feel of the clutch loading to be maintained at all times through the direct application of manual force to both clutch bands 4 and 5. Toggle 11 is floating and acts as an equalizing differential to apply manual force to both bands simultaneously and with the differential ratio maintained constant at all times until the toggle is over dead center at which time the clutch members are fully applied. Neither band 4 or 5 can be applied without the other being applied at the same time and with same degree of manual force on each. The application of each band reacts on the other band to make their engagement with the drum simultaneous and with equal degree of manual force.

Rocking of lever 24 outwardly at its right end seen in dotted lines in Figure 1, by the coacting ball member 13, will directly rock the middle arm 24a of said lever 24 leftwardly, on the spider supported pivot member 23, thereby actuating the pivot bolt connector 34 which moves the live end of main clutch member 5 into engagement with the clutch drum or flange 3, and also shifts the outer end of lever 22. The loading of the booster clutch band 4 obviously will cause said band to apply the power of the shaft 1 to exert a pull on the outer end of lever 22 for engaging the main clutch 5, supplementing the manual force applied thereto through the lever 24 and its arm 24a and associated ball 13. Shaft 17 is mounted in a bearing 17a on spider 6.

Having thus described my invention, what I claim as new and desire to secure by Letters Patent of the United States, is:

1. In clutch mechanism, in combination, a driving member, a driven member including a clutch drum, a main clutch band engaging the inner surface of said drum, a spider fixed to the driving member and rotatable therewith, a dead-end connection between the main clutch band and spider, a booster clutch band engaging the outer surface of the drum and having a dead end means connecting said dead end with the live end of the main clutch band and with the spider for rotation therewith, and shifting means on said spider for simultaneously applying the clutch bands to the clutch drum.

2. A clutch as claimed in claim 1, in which the shifting means comprises a toggle supported on said driving member and shiftable relative thereto and a manually operable member rotating with the toggle and movable to simultaneously apply the live ends of the bands to the clutch drum.

3. A clutch as claimed in claim 1, in which the shifting means comprises a toggle and a manually operable member rotating with the toggle and movable to simultaneously apply the live ends of the bands to the clutch drum, and in which the connection between the dead end of the booster band and the live end of the main band includes a lever pivoted to the spider and having connections attaching same to the live end of the main band and the dead end of the booster bands.

4. A clutch as claimed in claim 1, in which the shifting means comprises a toggle and a manually operable member rotating with the toggle and movable to simultaneously apply the live ends of the bands to the clutch drum, and in which the connection between the dead end of the booster band and the live end of the main band includes a lever pivoted at one end to the spider, having pivotal connection intermediate its ends with the live end of the main band, and having pivotal connection at its other end with the dead end of the booster band.

5. In clutch mechanism, in combination, a driving member, a driven member including a clutch drum, a main clutch member engaging a surface of the drum, a spider fixed to the driving member and rotatable therewith, a dead end connection between the main clutch member and the spider, a booster clutch member engaging another surface of the drum and having means connecting its dead end with the live end of the main clutch member and with the spider, and means connecting the live ends of the booster and main clutch member to manually apply the live ends of both clutch members to the drum.

6. In clutch mechanism, in combination, a driving member, a driven member including a clutch drum, a main clutch member engaging a surface of the drum, a spider fixed to the driving member, a dead end connection between the main clutch member and the spider, a booster clutch member engaging another surface of the drum and having its dead end connected to the live end of the main clutch member, and means to manually apply the live ends of both clutch members to the drum, including a toggle lever, parts operable simultaneously to apply the live ends of the clutch members to the drum, and a lever operable by one of said parts and forming a connection between the dead end of the booster clutch member and the live end of the main clutch member.

RAYMOND A. BECKWITH.

REFERENCES CITED

The following references are of record in the file of this patent:

UNITED STATES PATENTS

| Number | Name | Date |
|---|---|---|
| 1,554,515 | Morgan | Sept. 22, 1925 |
| 1,669,878 | Monroe | May 15, 1928 |
| 1,795,082 | Dehn | Mar. 3, 1931 |
| 2,206,182 | Gille | July 2, 1940 |

FOREIGN PATENTS

| Number | Country | Date |
|---|---|---|
| 358,086 | Germany | Sept. 5, 1922 |